United States Patent [19]

Rodenbeck

[11] 4,352,305
[45] Oct. 5, 1982

[54] APPARATUS FOR STRIPPING INSULATION FROM WIRE

[75] Inventor: Philip G. Rodenbeck, Fort Wayne, Ind.

[73] Assignee: General Electric Company, Fort Wayne, Ind.

[21] Appl. No.: 175,442

[22] Filed: Aug. 5, 1980

[51] Int. Cl.³ .............................................. H02G 1/12
[52] U.S. Cl. .................................................. 81/9.51
[58] Field of Search ........................... 81/9.51; 29/564.4

[56] References Cited

U.S. PATENT DOCUMENTS

| | | | |
|---|---|---|---|
| 2,703,026 | 3/1955 | Basile et al. | 81/9.51 |
| 2,880,635 | 4/1959 | Harris | 81/9.51 |
| 3,505,720 | 4/1970 | Heimbrock | 81/9.51 |
| 3,962,780 | 6/1976 | Kindig | 29/596 |
| 4,117,749 | 10/1978 | Economu | 81/9.5 R |

FOREIGN PATENT DOCUMENTS 52-36774 3/1977 Japan .................................. 81/9.51

OTHER PUBLICATIONS

The Eraser Co., Inc. publication,—Pre-Stripper for "Uniform" Coil Leads—Model I-K-7.

*Primary Examiner*—Roscoe V. Parker

*Attorney, Agent, or Firm*—Ralph E. Krisher, Jr.

[57] ABSTRACT

Apparatus for stripping insulation off wire in a stator coil winding machine. A frame supports a blade assembly including circularly spaced blades that encircles moving wire in the machine. The blades are individually pivotally mounted so they can rock against the wire. The array of blades rotates about an axis coaxial with the wire and cuts insulation off the wire as it moves therethrough. The blades rock due to a thrust block that rotates in synchronism with the blades, and moves axially against the blades. A thrust block cam surface engages cam surfaces on the blades and thus pivots them against the wire. Depth of penetration of the blades is controlled very accurately by a cam follower engaging a cam surface on an adjustably positioned wheel. During stripping, the wire stops, and a pulley arrangement forms an open wire loop downstream of the blades by pulling wire transversely from the normal wire travel path. This pulls an equal length segment of wire through the rotating blades for removal of insulation. Preferably, the wire is tensioned upstream of the cutting blades during the cutting operation to decrease the tendency of the wire to move laterally as it is being stripped. After stripping, the stripped segment of wire moves into the winding machine and is severed near its center by a cutoff device.

30 Claims, 11 Drawing Figures

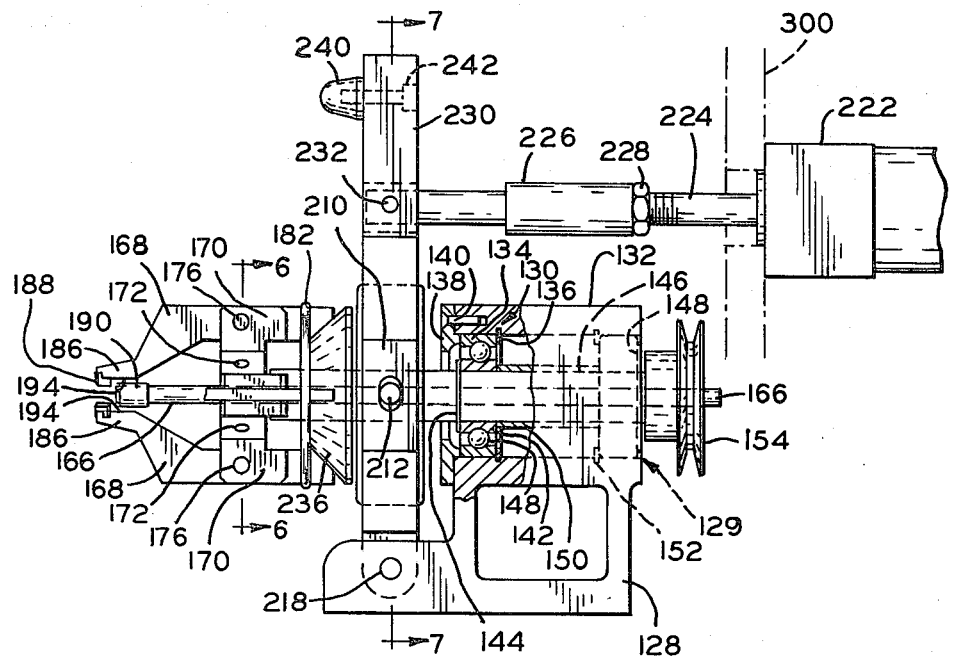
FIG 3
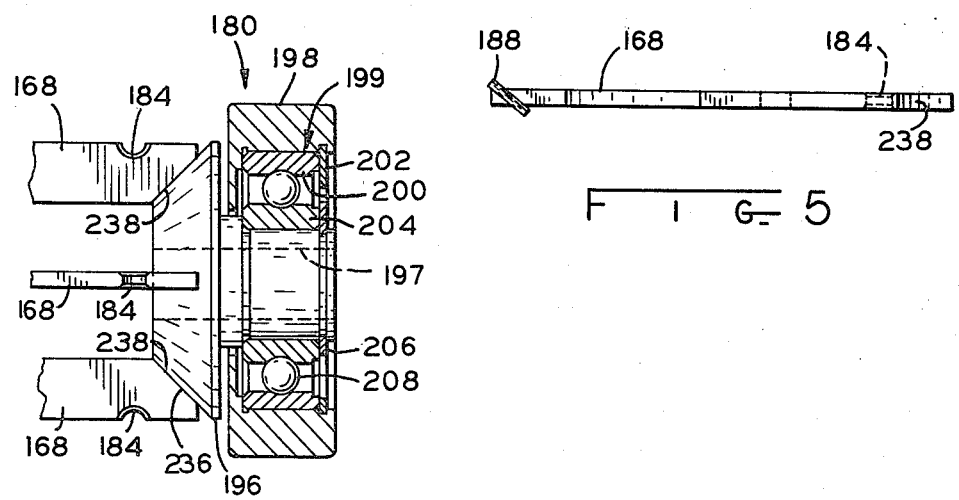
FIG 4
FIG 5

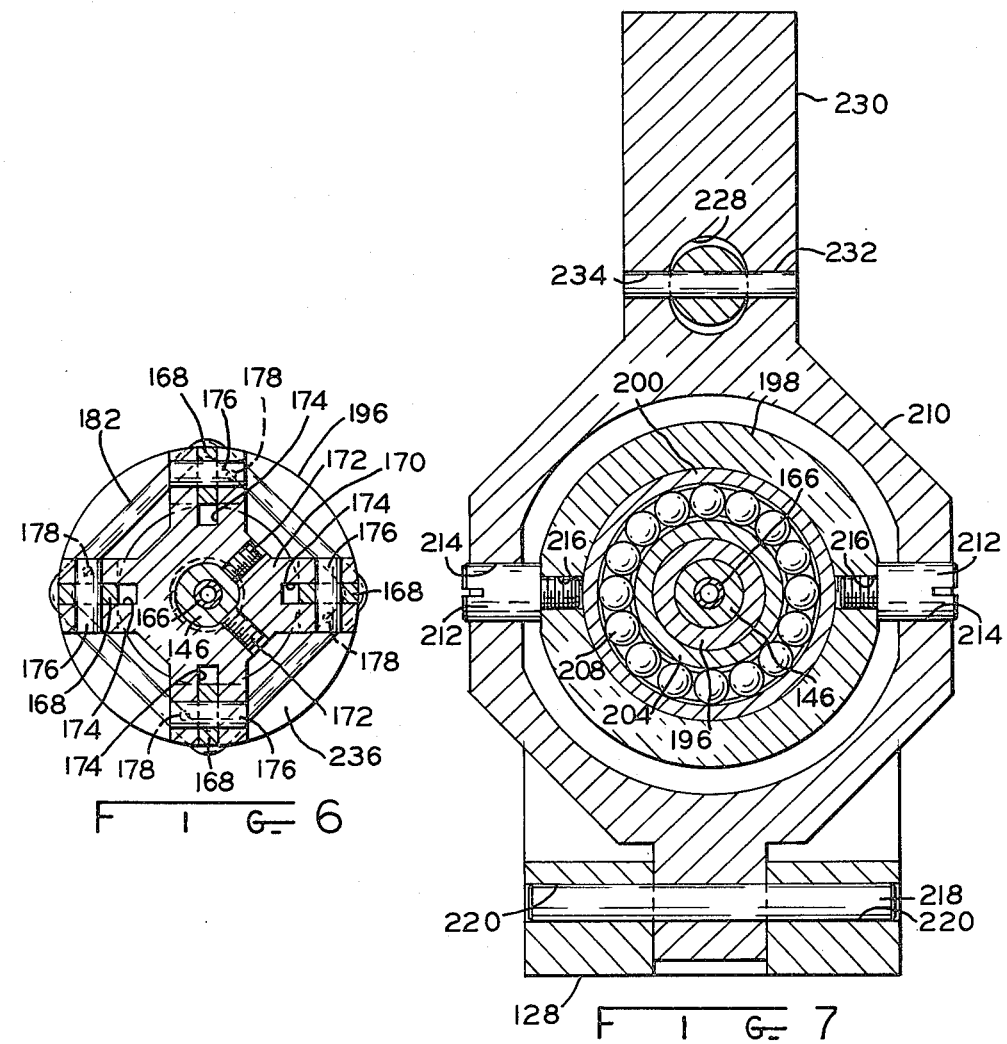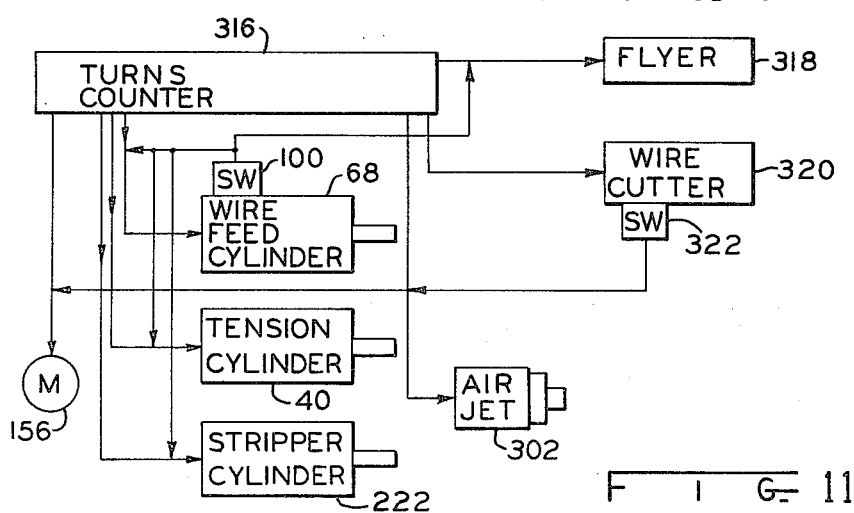

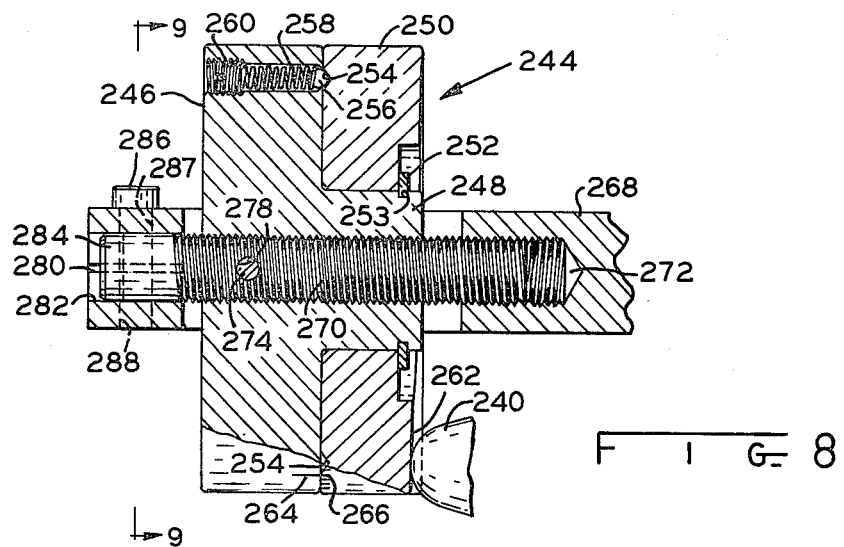
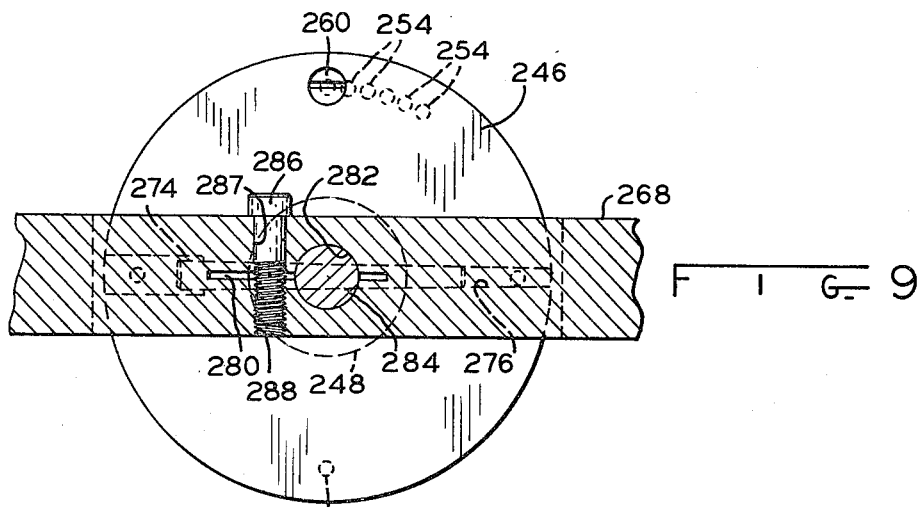
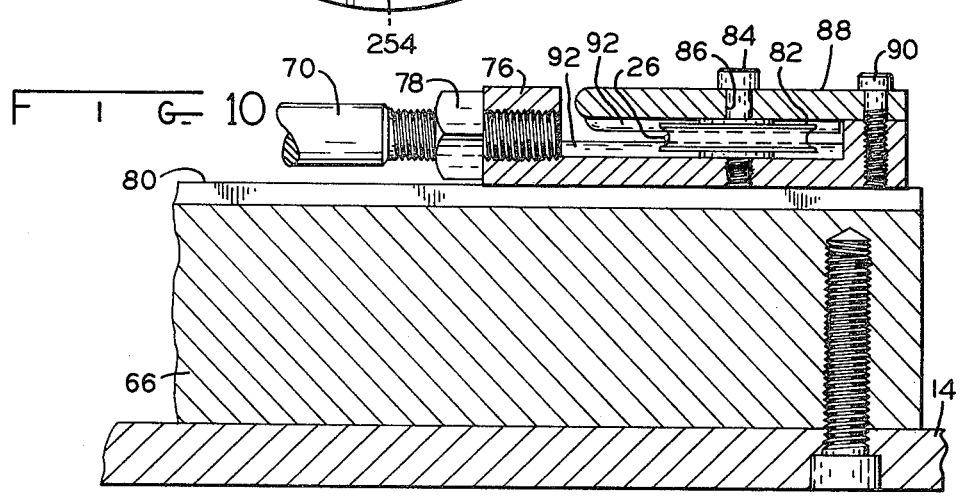

APPARATUS FOR STRIPPING INSULATION FROM WIRE

BACKGROUND OF THE INVENTION

The present invention relates to apparatus for stripping the insulation from a segment of indeterminate length wire, and in particular to the use of such apparatus in connection with machines for forming stator coils.

In the manufacture of electric motors and other dynamoelectric machines, the excitation windings are usually made of magnet wire comprising a copper or aluminum core covered with a suitable layer of insulation, which may comprise a very thin coating of varnish or polyester resin. The wire is fed into the winding machine, formed into coils, as by the wind and shed technique, for example, and inserted into the slots of the stator core. Winding machinery of the wind and shed type is well known, and is described in the following exemplary U.S. Pat. Nos., which are expressly incorporated herein by reference: Lauer et al. 3,977,444; Arnold et al. Re. 29,007; Cutler et al. 3,672,026; Arnold 3,672,027; Cutler et al. Re. 27,415; Smith 3,510,939; Lauer 3,765,080; Lauer 3,579,791; Smith 3,514,837; Arnold et al. 3,973,601; and Arnold 3,967,658.

During or after the winding process, the wire is cut at one or more places so as to produce a plurality of free ends. The wire ends are connected to a lead set, other motor windings, or terminal devices. Before the connections can be made, however, it is necessary to remove the insulation from the wire. In the past, one technique for removing the insulation was that of brazing wherein the operators would twist the wire ends around whatever they were to be connected and then heat them with a small torch, at the same time touching the heated wire and other wire or connection device with silver solder. The torch would burn away the insulation, while at the same time melting the solder so that a good solder connection was established. As electric motor technology has become more sophisticated, however, insulations have been developed which can withstand much higher temperatures, even exceeding the temperature produced by the torch. As a result, the copper or aluminum core of the wire is melted before the insulation so that all that remains is a very fine tubular segment of insulation having no conductive material therein. Obviously, this prevents the establishment of electrical conduction between the wire and the connection device.

Another prior art technique for making electrical connections to the wire ends is to utilize crimp connection devices, which pierce the insulation and make contact with the conductive core of the wire. Examples of this technique are disclosed in U.S. Pat. Nos. 3,505,720 (Heimbrock) and 3,962,780 (Kindig). There have been substantial problems of reliability with crimp connection devices, however, particularly in demanding applications wherein it is necessary for the connections to maintain very good conductivity over a long period of time.

In order to avoid the reliability problems of crimp connection devices, it has often become necessary to use mechanical, hand-operated insulation strippers which strip off the insulation by scraping or cutting action. One such device is disclosed in U.S. Pat. No. 4,117,749 (Economu). It is also known to use small, hand-held strippers wherein a plurality of rotating blades driven by, for example, a pneumatic motor, spin around the wire and cut the insulation from a segment thereof.

A more automatic version of the rotating blade stripper is manufactured by The Eraser Company, Inc., of Syracuse, N.Y. In this apparatus, the wire is fed through the center of the machine and advanced through the center of the rotating stripper blades by means of an automatic clamp device which grips the wire and moves it by a predetermined distance. The cutter blades are mounted on individual axes and caused to rock inwardly by means of a cam-like thrust block which is rotating in synchronism with the blades and is pressed axially against complementary cam surfaces on the blades so as to cause them to pivot inwardly. The depth of cut is controlled by adjusting the axial distance through which the thrust block is moved by a pneumatic piston and cylinder.

As disclosed in copending application Ser. No. 175,441, it is also known to mount a wire insulation stripper of the rotating blade type so that feed wire to a coil winding machine passes therethrough. In this case, the feed wire would pass through the stripper apparatus and then to a rotating spindle or flyer on the winding machine, and the stripper will be positioned at a predetermined distance from the wire cutoff device of the winding machine. Attempts have been made to strip wire as it is being drawn into the winding machine by the spindle or flyer, but the linear speeds of the wire are so great that it was virtually impossible to remove all of the insulation on the wire. The insulation was removed in a spiral pattern, which was not suitable for establishing good solder or brazed connections. Furthermore, the speeds were so great that the wire would have a tendency to become caught and break. To alleviate this problem, the wire would be stopped and then pulled slowly through the rotating blades. It is further disclosed in said application to interconnect the wire stripper with the control panel of a conventional winding machine so that the wire could be stopped, the stripper actuated, etc. on certain turn counts. For a given machine, then, the position of the stripped segment of wire could be located precisely between the blades of the cutter without the necessity for intervention by the machine operator.

Some of the problems experienced with the above-discussed prior art techniques are those of wire breakage and inability to control very accurately the depth of cut. Because of the fine diameter of the wire used in many stator coils, it is crucial to remove only the insulation without cutting into the conductive core itself. Not only does an excessively deep cut lower the tensile strength of the wire, but it reduces its current carrying capacity. Wire breaking during stripping was often caused by the wire deviating from the exact center of the blades, and it was found that very accurate wire guiding devices were needed to ensure that the wire did not deviate laterally from the normal path of travel during the stripping operation.

Accordingly, it is a general object of the present invention to provide apparatus wherein enamel coated wire being fed to a coil winding machine has the enamel insulation effectively stripped therefrom along a desired segment of the wire.

It is another object of the present invention to provide apparatus for stripping wire having very thin layers of insulation wherein a very precisely controlled depth of insulation removal is possible so that the current carrying capacity and tensile strength of the stripped segment of wire can be maintained at a maximum for a given wire size.

It is yet another object of the present invention to provide apparatus for stripping a segment of wire being fed to a coil winding machine wherein the length of the stripped segment can be accurately controlled.

It is yet another object of the present invention to provide an apparatus for stripping wire which can easily be incorporated into the wire feed paths of existing coil winding machines.

It is a further object of the present invention to provide apparatus for stripping the insulation off wire by means of rotating blades wherein the wire is maintained very accurately in the center of the blades so as to avoid breaking and deforming the wire.

SUMMARY OF THE INVENTION

In carrying out the above and other objects and advantages of the invention, in one preferred form thereof, there is provided a method of stripping insulation from wire which is being fed to a coil winding machine or other apparatus wherein stripping of a segment of wire is desired. The wire is first fed through an adjustable tensioning device, and from there through a plurality of blades which are arranged in a circular array and positioned around the wire. The blades rotate about an axis coincident with the wire and are caused to move radially inwardly against the surface of the wire so as to cut insulation therefrom. The wire is pulled through the rotating blades at a controlled rate and for a predetermined distance by means of a pulling device which distorts the normal travel path of the wire by forming an open loop therein. The pulling device is located between the rotating blades and the coil winding apparatus, and pulls against the tension of the wire established, in part, by the tensioning device, which is located in the wire travel path on the opposite side of the rotating blades. The tensioning device serves to tension the wire during winding and to maintain the travel path of the wire straight so that it will not deviate from the exact center of the blades as they move inwardly and begin cutting off the insulation.

In order to maintain the cutting blades free of debris and to enhance the removal of loose insulation from the wire once it has been cut, a blast of air is directed against the blades. The insulation removed by the blades and blast of air may be carried away by a vacuum system having its inlet located in the vicinity of the blades.

The depth of cut made by the blades is very accurately controlled by limiting the extent to which the blades are rotated inwardly torward the wire. Furthermore, the length of wire segment stripped and the speed at which it is pulled through the rotating blades can be accurately controlled by controlling the length of open loop formed in the wire and the speed at which it is formed.

In accordance with one aspect of the invention, there is provided a method of stripping the insulation from wire comprising the steps of: providing a circular array of rotating blades, feeding wire through the center of the circular array of blades, causing the rotating blades to move radially inwardly by a predetermined radial distance against the wire to cut the insulation off the wire while at the same time forming an open loop in the wire so as to pull a segment of wire through the rotating blades, thereby cutting the insulation off the segment of wire pulled through the blades.

In accordance with another aspect of the invention, there is provided a method of stripping the insulation from wire being fed into a stator coil winding machine comprising the steps of: providing a circular array of rotating blades, causing the wire to be drawn through the circular array of blades by the coil winding machine, deactivating the coil winding machine to stop the movement of wire through the blades, then causing the blades to move radially inwardly by a predetermined radial distance against the wire so as to cut the insulation off the wire while at the same time forming a loop in the wire between the blades and the coil winding machine. The formation of the loop pulls a segment of wire through the rotating blades thereby cutting the insulation off the segment of wire pulled through the blades. The blades are then moved radially outwardly so as to disengage from the wire, and the wire is then again drawn through the rotating blades by reactivating the coil winding machine.

In a preferred form of the apparatus according to the present invention, there is provided a support frame on which is mounted a blade assembly, a tensioning device on the upstream side of the blade assembly, and a puller device on the downstream side thereof. The tensioning device, blade assembly and puller device together define a wire travel path along which the wire travels as it is being fed to the coil winding machine.

The blade assembly comprises a plurality of blades arranged in a circular array around the wire travel path, and wherein each of the blades is pivotally mounted about an individual axis for radial inward rocking motion toward the wire travel path. The blades are rotated about the wire travel path and are caused to rock inwardly by means of a thrust block which is also rotating and in synchronism with the blades. The thrust block includes a cam face which engages complementary cam surfaces on the blades, and as the thrust block is urged against the blades by means of a pneumatic or hydraulic piston and cylinder, the blades rock inwardly so that their cutting tips engage the surface of the wire and cut the insulation therefrom as the wire is pulled through the blades. The depth of cut is controlled by limiting the degree of axial movement of the thrust block. This is achieved by means of a cam follower which engages the contoured face of a cam wheel that is adjustably mounted.

The wire is pulled through the rotating blades by means of a pulley arrangement wherein one of the pulleys is moved laterally against the wire so as to form an open loop therein. The length of the wire which is pulled through the blades and the speed at which it is pulled is controlled by controlling the speed at which and the distance through which the pulley is moved. In order to constrain the wire to move in a straight path through the rotating blades and to remain at the exact center of the blades, the wire is tensioned at a point upstream of the blades by the aforementioned tensioning device. During normal feeding of the wire through the apparatus to the coil winding machine, the tensioning device may be relaxed.

A blast of air is directed against the rotating blades as they are cutting the insulation off the wire so as to assist in removing particles of insulation and keeping the blades clean. The wire then passes over or through a brush which is for the purpose of loosening large particles of insulation which were not previously removed.

One preferred form of apparatus according to the invention comprises a support frame, a wire guide system connected to the support frame for guiding the wire along a predetermined normal wire travel path, and a blade assembly mounted on the frame. The blade assembly comprises a plurality of circularly spaced blades encircling the wire travel path, and wherein the blades are rotatable about an axis coaxial with the wire travel path. A blade actuation device engages the blades and causes them, while rotating, to move radially inwardly toward the wire travel path by a predetermined radial distance, whereby when wire is in the travel path, it will have the insulation stripped therefrom by the rotating blades. A puller device engages the wire traveling along the travel path and distorts the normal wire travel path so as to pull a predetermined length of wire through the rotating blades, whereby the blades will strip the insulation off said predetermined length of wire.

BRIEF DESCRIPTION OF THE DRAWINGS

The subject matter which I regard as my invention is particularly pointed out and described in the concluding portion of the specification. My invention itself, however, both as to its organization and method of operation, together with further objects and advantages thereof, may best be understood by reference to the following description taken in connection with the accompanying drawings wherein:

FIG. 3 is an enlarged, elevational view, partially in section, of the blade assembly;

FIG. 4 is an enlarged, partially sectional view of the thrust block assembly and blades;

FIG. 5 is an enlarged elevational view of one of the blades;

FIG. 6 is an enlarged sectional view taken along line 6—6 of FIG. 3 and viewed in the direction of the arrows;

FIG. 7 is an enlarged sectional view taken along line 7—7 of FIG. 3 and viewed in the direction of the arrows;

FIG. 8 is an enlarged sectional view, partially in elevation, of the cutting depth adjustment mechanism;

FIG. 9 is a front elevational view of the mechanism of FIG. 8;

FIG. 10 is an enlarged sectional view taken along line 10—10 of FIG. 1 and viewed in the direction of the arrows; and FIG. 11 is a functional block diagram of the control arrangement.

DESCRIPTION OF THE PREFERRED EMBODIMENTS

Figure 1:
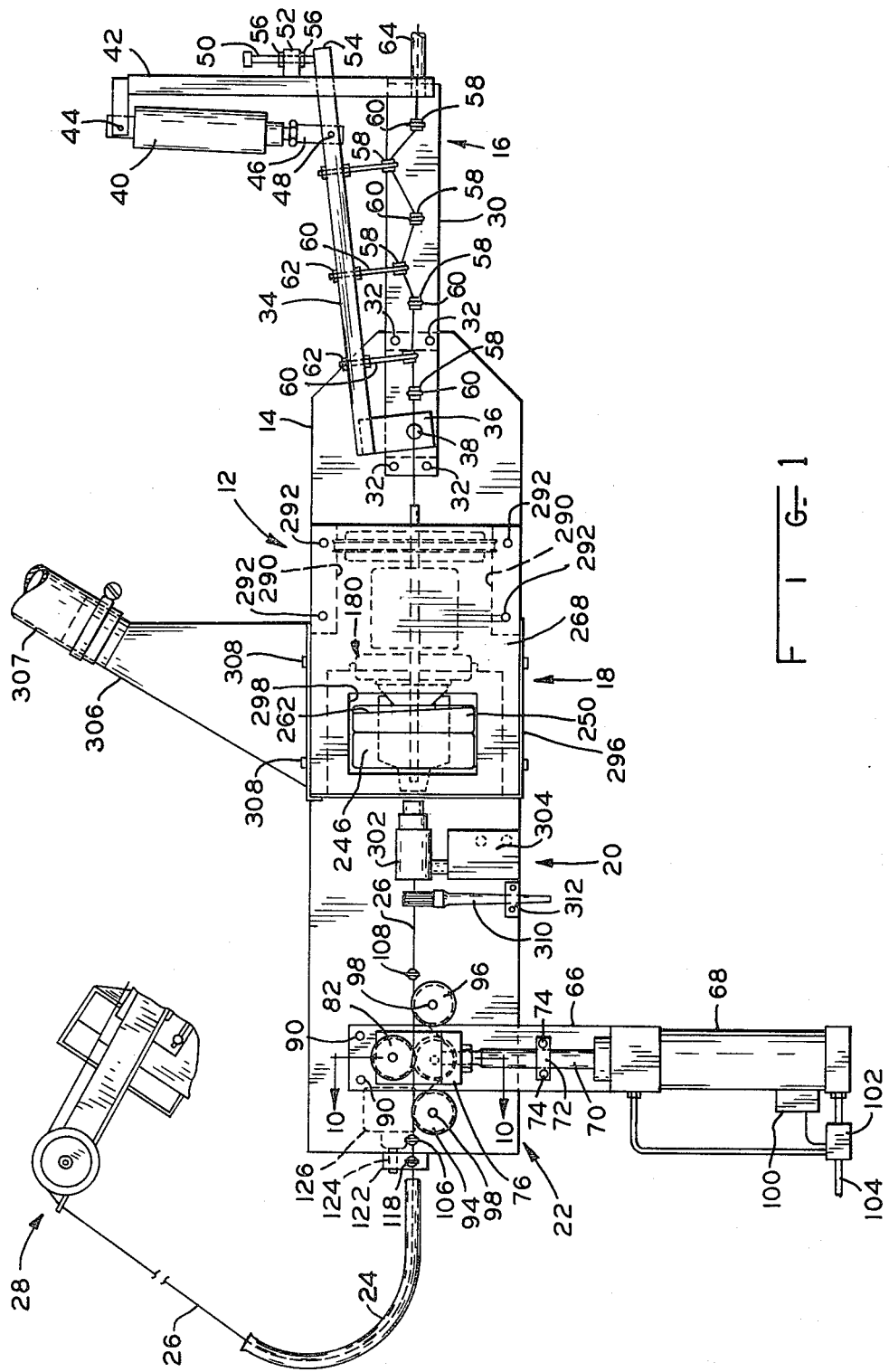
FIG. 1 is a plan view of the wire stripper apparatus according to the present invention.
Figure 2:
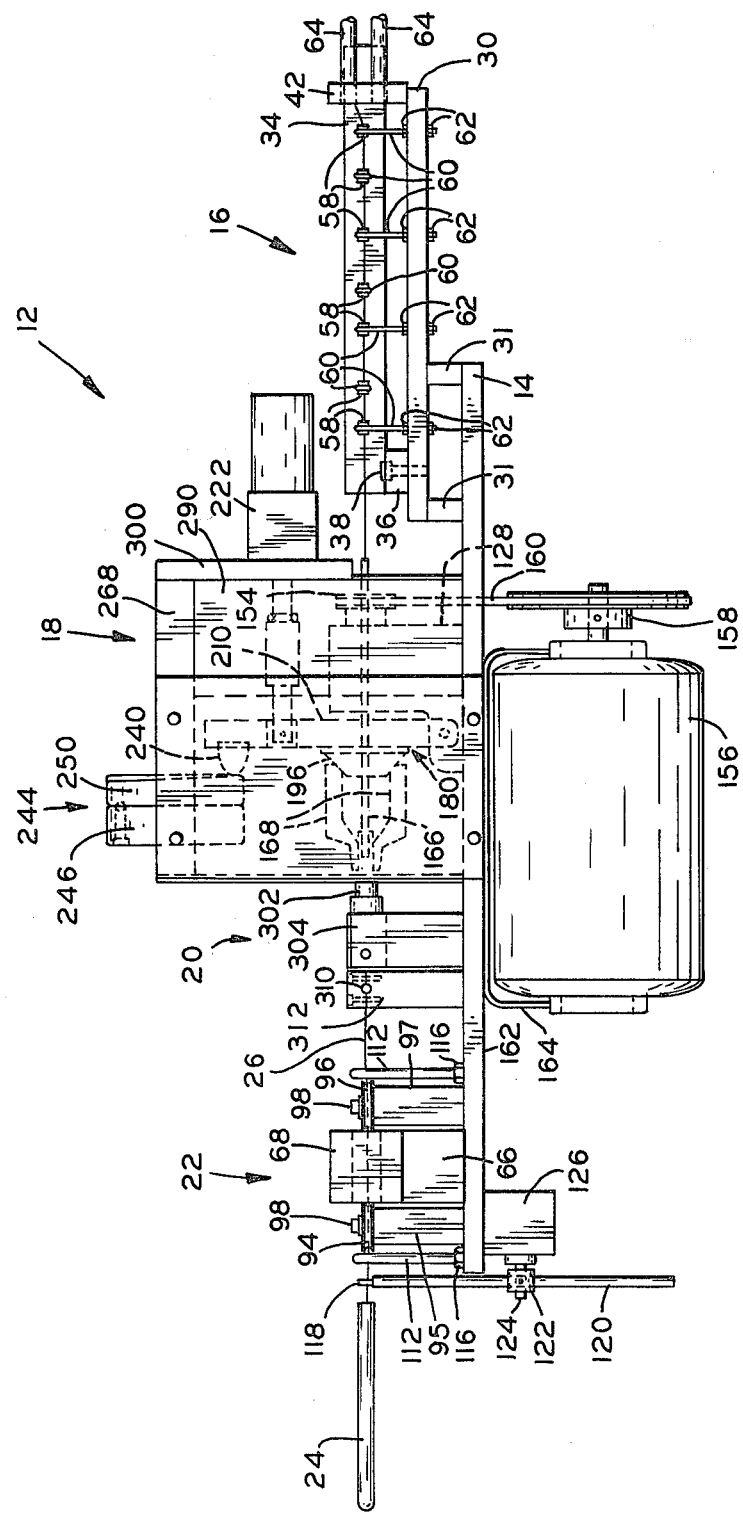
FIG. 2 is a side elevational view thereof.

With reference now to the drawings, and in particular FIGS. 1 and 2, the overall arrangement of the wire stripper apparatus 12 according to the present invention is illustrated. It comprises a base plate 14 to which is attached a tensioning device 16, a blade assembly 18, a particle removal system 20 and a wire pulling device 22. Supported at the discharge end of the apparatus 12 is a wire guide tube 24, which guides the wire 26 to the coil winding apparatus 28, a portion of which is illustrated in FIG. 1. As discussed in the preliminary portion of the application, coil winding machine 28 may be any one of a variety of prior art machines, such as those described in the aforementioned patents relating to wind and shed machines.

Wire tensioning device 16 comprises a base plate 30, which is rigidly fastened to base plate 14 by spacer blocks 31 and screws 32. Movable arm 34 is connected to base plate 30 through pivot block 36, the latter being pivotally connected to base plate 30 by shoulder bolt 38. Arm 34 is actuated by means of a pneumatic piston and cylinder 40, which is pivotally connected to bracket 42 by pivot pin 44 and to arm 34 through the piston connecting rod 46 and pivot pin 48. Bracket 42 is welded, bolted or otherwise secured to base plate 30. An adjustable stop 50 extends through an opening in bracket 52, and its axial position with respect to the end 54 of arm 34 can be adjusted by approximately positioning lock nuts 56. When pneumatic cylinder 40 is actuated so as to pull arm 34 away from base plate 30, in a horizontal plane, the end 54 of arm 34 will engage the end of stop 50. Pneumatic cylinder 40 is connected to a suitable source of pneumatic pressure (not shown).

The wire 26 is guided through tensioning device 16 by means of a plurality of carbide eyelets 58 connected to base plate 30 by means of rods 60, the latter secured to base plate 30 by nuts 62. The wire 26 is also guided by a second set of carbide eyelets 58, which are connected to arm 34 by rods 60 and nuts 62. It will be appreciated that, when piston and cylinder 40 is actuated, the eyelets 58 connected to arm 34 will distort the wire path thereby increasing the frictional drag and the linear tension of the wire 26. Wire 26 is fed into tensioning device 16 through one of wire guide tubes 64.

With additional reference to FIG. 10, the wire pulling device 22 will now be described. It comprises a cylinder mounting plate 66, which is screwed to plate 14 and has a hydraulic cylinder 68 mounted thereto. Cylinder 68 may be any suitable commercially available hydraulic cylinder, such as a Tom Thumb HVB cylinder. Cylinder 68 includes a connecting rod 70, which is connected to the piston (not shown). A split collar 72 is secured to connecting rod 70 by screws 74. The end of connecting rod 70 is threadedly secured to pulley mounting plate 76 and, because of the threaded connection, adjustment of the position of pulley mounting plate 76 relative to connecting rod 70 can be made. Lock nut 78 prevents connecting rod 70 from turning once the desired adjustment has been obtained. Pulley mounting plate 76 slides on the upper surface 80 of cylinder mounting plate 66, as best shown in FIG. 10. A pulley 82 is connected to mounting plate 76 by screw 84, which passes through an opening 86 in pulley retainer 88 and is threadedly secured to pulley mounting plate 76. Pulley retainer 88 is rigidly connected to pulley mounting plate 76 by screws 90. In order to prevent the wire 26 from becoming nicked or damaged by coming into contact with sharp edges, pulley mounting plate 76 and pulley retainer 88 are provided with rounded beads 92, which are soldered thereto. Beads 92 are provided both on the leading and trailing edges of retainer 88 and support plate 76.

A pair of additional pulleys 94 and 96 are pivotally secured to plate 14 by posts 95 and 97 and screws 98 about which the pulleys 94, 96 rotate. Pulleys 82, 94 and 96 are positioned such that the wire 26 passes in a substantially straight line from the blade assembly 18 to wire guide tube 24. When hydraulic cylinder 68 is actuated, however, connecting rod 70 will be retracted so as to pull pulley 82 against wire 26 thereby forming an open loop in wire 26 as shown in the dotted line position in FIG. 1. The extent to which connecting rod 70 will be retracted can be controlled by any one of a number of different techniques, such as adjusting rod 70, positioning collar 72 to contact cylinder 68, or by utilizing a magnetic switch 100 which senses the position of the piston within cylinder 68 and actuates the hydraulic control valve device 102 to shut off or reverse the hydraulic flow within cylinder 68. Magnet switch 100 may be of any commercially available type, such as a Tom Thumb No. AN10-6-04-2. Valve 102 is fed by hydraulic fluid from line 104.

Since the wire 26 is firmly engaged by the spindle (not shown) or flyer (not shown) of the coil winding machine 28, it cannot be pulled rearwardly as pulley 82 is retracted. Accordingly, the wire will be pulled from the supply (not shown) through the tensioning device 16 and blade assembly 18. The length of wire which is pulled through blade assembly 18 can be accurately determined by adjusting the position of magnetic switch 100 or collar 72, because the amount of wire pulled through is directly related to the size of the open loop formed as the wire is distorted from its normal travel path of pulley 82. The speed at which wire 26 is pulled through the blade assembly 18 can be controlled by adjusting hydraulic valve 102. This technique for pulling wire 26 through blade assembly 18 is advantageous in that the wire is contacted by rolling surfaces, as opposed to clamps and the like, as in the case of certain prior art apparatus.

In order to further ensure that the wire 26 passes through the exact center of the blades in blade assembly 18, additional eyelets 106 and 108 are provided, and are connected to plate 14 by rods 112 and nuts 116. The wire also passes through eyelet 118, which is mounted to the upper end of the rod 120, the latter being secured to bracket 122. Bracket 122 is also connected to shaft 124, which is part of an Allen Bradley No. 802G-GP Series F limit switch. In the event wire 26 should break, rod 120 would be caused to deviate from its normal position thereby tripping limit switch 126, which will shut down the apparatus 12.

With additional reference now to FIGS. 3, 4, 5, 6, and 7, the blade assembly 18 will be described. Blade assembly 18 comprises a pedestal 128 (FIG. 3), which is screwed to base 14, and has bearings 129 and 130 mounted therein. Bearing 130 comprises an outer race 134 held in position by snap ring 136 and bearing cap 138, the latter secured to pedestal 128 by screws 140. The inner race 142 of bearing 130 is held in place by snap ring 144, which is received in a groove in shaft 146. A plurality of balls 148 are captured between inner race 142 and outer race 134. The other bearing 129 is held against the rear shoulder 148 of pedestal 128 by spacer 150, which is in abutment with the respective inner races of bearings 130 and 129. A snap ring 152 holds the outer race of bearing 129 in place.

A shaft 146 extends through the inner races of bearings 129 and 130 and has a pulley 154 drivingly connected to its rear end. An electric motor 156 (FIG. 2) drives pulley 154 through pulley 158 and belt 160. Motor 158 is secured to the underneath side 162 of base plate 14 by mounting bracket 164. A tube 166 extends through hollow shaft 148 and is press fit therein. Tube 166 extends completely through blade assembly 18 and serves as the guide for wire 26 as it is fed through the apparatus 12.

Referring now particularly to FIGS. 3, 4 and 6, blade assembly 18 comprises four blades 168, which are connected to shaft 146 by spider 170. Spider 170 is keyed to shaft 146 by set screws 172 (FIG. 6) and includes four slots 174 within which blades 168 are received. Blades 168 are pivotally connected to spider 170 by pivot pins 176, which, in turn, are held in place by set screws 178. This arrangement permits blades 168 to rock about pivots 176 when they are actuated by the thrust block 180 (FIG. 4); blades 168 are biased to their open, non-engaged positions by a resilient O-ring 182, which is received within cutouts 184. It will be appreciated that O-ring 182 is on the opposite side of the fulcrum points defined by pins 176 from the forward ends 186 of blades 168.

The forward ends 186 of blades 168 have sharpened, carbide cutting tips 188 brazed thereto. As shown in FIG. 5, cutting tips 188 are disposed at 45° angles relative to the centerline of blades 168 so that, when they are in engagement with the wire being drawn through blade assembly 18, they overlap somewhat so as to form a diamond-shaped opening which tends to center the wire as the insulation is being stripped therefrom. A cylindrical spacer 190 is received over the forward end of tube 166 and welded thereto. Spacer 190 is dimensioned such that it will be contacted by the inner edges 194 of blades 168 as they are rocked inwardly and allow a minimum of 0.010 inches between the cutting edges of carbide tips 188. The purpose of this is to prevent the blades from closing to too great an extent thereby damaging the tips 188. Tube 166 is preferably tapered inwardly on its inner surface just prior to the exit end thereof so as to confine the wire to the exact center of cutter tips 188 as it exits tube 166.

With particular reference to FIGS. 3, 4 and 7, it will be seen that thrust block 180 comprises a cone element 196 having a bore 197 within which shaft 146 is received. Cone element 196 is capable of rotation relative to outer ring 198 by virtue of bearing 199. Bearing 199 comprises an outer race 200 retained in place by snap ring 202, an inner race 204 retained in place by snap ring 206, and a plurality of balls 208 captured between inner race 204 and outer race 200.

Outer ring 198 is mounted to yoke 210 (FIG. 7) by hinge pins 212, which are loosely received within openings 214 in yoke 210 and are threaded into sockets 216 in outer ring 198. Yoke is pivotally connected to pedestal 128 by dowel 218, which is press fit within openings 220 in pedestal 128.

Yoke 210 is pivoted back and forth on dowel 218 by air cylinder 222 (FIGS. 2 and 3), which includes a connecting rod 224 adjustably connected to pressure stud 226 by a threaded connection and locked in place by lock nut 228. Pressure stud 226 extends through an opening 228 in the upper portion 230 of yoke 210 and pivots on dowel 232, which is press fit in openings 234 in the upper portion 230 of yoke 210. As the piston (not shown) of air cylinder 222 is advanced, the above-described linkage will push yoke 210 forwardly, which, in turn, pushes thrust block 180 forwardly. Cone element 196 includes a frusto-conical cam surface 236, which engages complementary cam surfaces 238 on the rear ends of blades 168. As cone element 196 is pressed forwardly, it urges the rear ends of blades 168 radially outwardly, thereby causing blades 168 to rock about their respective pivots 176. This causes the forward ends 186 of blades 168 to rotate inwardly so as to bring the cutting tips 188 into contact with the surface of the wire 26 being drawn out the forward end of tube 166. When cylinder 222 retracts, thrust block 180 will be pulled rearwardly and the resilience of O-ring 182 will cause blades 168 to resume their initial positions thereby retracting cutting tips 188 away from wire 26.

The depth of cut is controlled by limiting the degree to which thrust block 180 is moved axially against blades 168. This is accomplished by means of a cam follower 240 connected to the upper portion 230 of yoke 210 by screw 242. FIGS. 8 and 9 show in detail an adjustable stop mechanism 244 which is engaged by the cam follower 240. Stop mechanism 244 comprises a ratchet wheel 246 having a shaft portion 248 on which is rotatably received a cam wheel 250. Cam wheel 250 is retained on ratchet wheel 246 by means of snap ring 252, which is received within an annular slot 253 in the shaft portion 248 of ratchet wheel 246. Cam wheel 250 includes a plurality of recesses 254 arranged in a circular array around the entire periphery of wheel 250. A ball 256 is urged into a selected one recess 254 by means of spring 258 held in place by recessed screw 260. This detent mechanism permits cam wheel 250 to be turned by increments as defined by the positions of recesses 254.

Cam wheel 250 includes a cam face 262, which is contoured such that, as wheel 250 is turned, the depth of cut presented to cam follower 240 will vary. As will be appreciated, the further that cam follower 240 is permitted to be pushed forwardly by air cylinder 222, the greater the distance that blades 168 will rotate inwardly. Ratchet wheel 246 has a scribe line 264 etched thereon, and cam wheel 250 has a plurality of scribe lines 266 etched thereon across from line 264, which are calibrated in terms of wire diameter. This enables cam wheel 250 to be turned to the proper setting for a given wire diameter and thickness of insulation so as to remove only the insulation without cutting into the conductive core of the wire.

Ratchet wheel 246 is secured to the upper plate 268 of blade assembly 18 by means of adjustment screw 270, which is threaded into socket 272 in upper plate 268. Ratchet wheel 246 is keyed to adjustment screw 270 by pin 274 (FIG. 9), which is received within a tapered hole 276 in wheel 246 and extends into hole 278 in screw 270. The forward end of top plate 268 is provided with a saw cut 280 extending from the opening 282 in which the head 284 of screw 270 is received. Cap screw 286 passes through an opening 287 above saw cut 280 and is threaded into socket 288 below saw cut 280. When screw 286 is tightened, the head 284 of screw 270 will be clamped in opening 282. If it is desired to recalibrate the stop mechanism 244, screw 286 is loosened and the entire assembly including wheels 246 and 250 and screw 270 is turned thereby adjusting the axial position of the assembly relative to top plate 268 and cam follower 240. When a desired position has been reached, screw 286 is again retightened so as to clamp screw 270 against further rotation.

The enclosure for blade assembly 18 comprises a pair of side plates 290 which are screwed to base plate 14, a top plate 268 connected to side plates 290 by screws 292, and guard 296 which is connected to top plate 268 and base 14. An opening 298 in top plate 268 accommodates the adjustable stop mechanism 244 described above. Air cylinder 222 is supported by cylinder mounting plate 300, which is secured to top plate 268 and side plates 290.

In order to assist in removing the particles of insulation stripped from wire 26 by blades 168, an air blast is directed against the cutting tips 188 of blades 168 and against wire 26 by means of a Vortec Model 901 air jet 302 (FIGS. 1 and 2) manufactured by Vortec Corporation. Air jet 302 has an opening completely through the center of it so as to permit the passage of wire 26, and develops an annular air stream which converges on wire 26 and blade tips 188. Air jet 302 is supported by mounting bracket 304 and supplied with pressurized air from a suitable source (not shown). The blast of air assists in removing particles from the wire as it is being stripped by blades 168, and these particles are drawn away by means of a vacuum system comprising chute 306 connected to top plate 268 and base 14 by screws 308. Since the side of blade assembly 18 to which chute 306 is attached is open, the loosened particles blown rearwardly by jet 302 will be drawn through chute 306 and hose 307 for collection and disposal.

A brush 310, which is supported by bracket 312 connected to base plate 14, is positioned within or just above or below the wire travel path, and serves to knock large, loosened particles off wire 26 which were not removed by the air blast from jet 302.

The stripper 12 may be used in combination with a coil winding machine 28 and tied into its sequencing operation by monitoring the turns counters on such machine. Of course, the particular manner of integrating the stripper 12 with the winding machine 28 will depend on the design of the winding machine and on the particular stator configuration which is being wound.

FIG. 11 illustrates in a very general, schematic fashion the functional relationship between the turns counter 316 of the winding machine 28, the flyer 318, wire cutter 320, wire feed cylinder 68, tension cylinder 40, stripper cylinder 222, motor 156 and air jet 302. Although turns counter 316 is shown as a single block, it may comprise a plurality of well known individual counters which may each be preset for a certain number of counts of the flyer 318.

The stripper 12 operates in the following manner. Initially, the turns counter 316 is set for the proper turn count on the last step of the coil form (not shown) in the wind and shed winding machine 28 prior to the point where stripping is desired. The stopping position of the flyer will determine the location of the stripped portion of wire, and the proper count can be determined by taking into consideration the location of the stripper 12 relative to the flyer, the diameter of the last coil to be wound, etc. For example, a setting of 1/100 on the counter 316 may equal a wire length of approximately ⅜ inches. The length of stripping is determined by adjusting the position of split collar 74 on rod 70, which contacts the body of cylinder 68 when rod 70 is retracted, and by adjusting the position of magnetic limit switch 100 (FIG. 1). The speed at which hydraulic cylinder 68 will retract is adjusted by adjusting the hydraulic flow in valve mechanism 102. A suggested speed is four inches per second.

The depth of cut is adjusted by rotating cam wheel 250 (FIG. 8) to the proper position for the wire size and insulation depth of the wire 26 being stripped. Flow controls may be provided on air cylinder 222 to control the rate at which blades 168 move inwardly as they contact the wire 26, and also to prevent against any hammering action. The amount of tension desired is obtained by adjusting stop 50 (FIG. 1).

The wire is then fed from tube 64 through eyelets 58, through tube 166 within blade assembly 18, past cutting tips 188, through air jet 302 and brush 310, through eyelet 108, between pulleys 94, 96 and pulley 82, through eyelets 106 and 118 and then through tube 24 to the winding machine 28.

The winding machine 28 is started, and when a specific turns count is reached as indicated by turns counter 316, motor 156 is activated and the blades 168 begin to rotate. When the counter reaches the strip count which was previously set, the flyer 318 stops, and then the signal is given by turns counter 316 to strip the wire 26. This simultaneously actuates stripper cylinder 222 causing blades 168 to pivot inwardly, tension cylinder 40 to retract thereby increasing the tension on wire 26, and wire feed cylinder 68 to retract thereby pulling a loop within wire 26, which causes the wire 26 to be pulled through rotating blades 168. At the same time, air jet 302 is activated and begins to blow the particles of insulation off the cutter tips 188 and wire 26. When wire feed cylinder 68 retracts to the preset position, limit switch 100 causes wire feed cylinder 68 to extend thereby causing pulley 82 to assume its initial position, causes tension cylinder 40 to extend so as to release the tension, causes stripper cylinder 222 to retract thereby causing blades 168 to lock radially outwardly away from wire 26, and signals the flyer 318 to begin winding the last few turns. When the flyer 318 reaches its total count, turns counter 316 will cause wire cutter 320 to retract and cut the wire, and a limit switch 322 thereon turns off motor 156 and air jet 302. If the turns counter 316 is properly set, the stripped segment of wire will be positioned in about the center of wire cutter 320, so that when the wire 26 is cut, there will be two stripped ends suitable for soldering to the lead set or other connection device. The above sequence is repeated for each set of stator windings which are formed. Of course, for many stator configurations, more than two leads will be necessary, so that more than one segment of wire will have to be stripped for every set of stator windings.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What I claim as new and desire to secure by Letters Patent of the United States is:

1. Apparatus for stripping the insulation off wire comprising:
a support frame,
wire guide means connected to said support frame for guiding wire along a predetermined normal wire travel path,
a blade assembly mounted on said frame comprising a plurality of circularly spaced blades encircling the wire travel path, and means for rotating said blades about an axis coaxial with the wire travel path, said blade assembly further comprising blade actuation means in engagement with said blades for causing said blades, while rotating, to move radially inwardly toward the wire travel path by a predetermined radial distance, whereby when wire is in the travel path, it will have the insulation stripped therefrom by the rotating blades,
said wire guide means including puller means for engaging wire traveling along the travel path and distorting the normal wire travel path so as to pull a predetermined length of wire through the rotating blades, whereby the blades strip the insulation off the predetermined length of the wire.

2. The apparatus of claim 1 including means for tensioning the wire beginning at a point in the wire travel path before said blades and extending at least past said blades.

3. The apparatus of claim 2 wherein said means for tensioning comprises a plurality of eyelets positioned generally in the travel path through which the wire travels, and means for moving some of said eyelets out of the travel path so as to distort the travel path of the wire.

4. The apparatus of claim 1 wherein said blades are pivotally mounted on individual axes in said blade assembly so as to be capable of rocking inwardly toward the wire travel path when actuated.

5. The apparatus of claim 4 wherein said blade actuation means comprises an element which is caused to move axially with respect to the axis of rotation of said blades about the wire travel path, and which engages said blades to cause the blades to rock inwardly.

6. The apparatus of claim 4 wherein said blades each includes a cam surface and said blade actuation means comprises a thrust block having a cam surface which engages the blade cam surfaces and causes the blades to rock inwardly.

7. The apparatus of claim 6 wherein said thrust block is rotatably mounted for rotation synchronized with the rotation of said blades, and is movable axially against said blade cam surfaces, and including cutting depth adjustment means for adjustably limiting the axial movement of said thrust block against said blades to thereby limit the degree to which said blades rock inwardly toward the wire travel path.

8. The apparatus of claim 4 wherein each of said blades includes a cutting tip having a cutting edge extending transversely and non-perpendicularly across the wire travel path when the blades are rocked inwardly.

9. The apparatus of claim 4 wherein each of said blades includes a cutting tip, and including a spacer element encircling the wire travel path and positioned to be engaged by the blades as they rock inwardly so as to limit the degree to which the blades can rock inwardly.

10. The apparatus of claim 9 wherein said spacer element is positioned adjacent the cutting tips.

11. The apparatus of claim 1 including means for directing a blast of air against said blades so as to clear away particles of insulation which are removed from the wire as it is being stripped by the rotating blades.

12. The apparatus of claim 11 wherein said means for directing a blast of air comprises an air nozzle through which the wire passes.

13. The apparatus of claim 11 including a vacuum removal means having an inlet in the vicinity of the blades for removing particles of insulation which are stripped from the wire.

14. The apparatus of claim 1 including a brush in the wire travel path following the blades and adapted to removed particles of insulation clinging to the wire.

15. The apparatus of claim 1 wherein said puller means comprises a pulley adjacent the wire travel path following said blades, and means for moving said pulley transversely with respect to the wire travel path so as to engage the wire and pull the wire out of the normal travel path thereby forming a loop in the wire causing the wire to be pulled through the rotating blades.

16. The apparatus of claim 15 including means for tensioning the wire during the time the loop is being formed by said puller means, the wire being tensioned between a point before said blades to a point after said blades.

17. The apparatus of claim 15 wherein said means for moving said pulley comprises a fluid piston and cylinder means for translating said pulley along a rectilinear path generally perpendicular to the wire travel path.

18. The apparatus of claim 1 wherein said puller means comprises a plurality of pulley means adjacent the wire travel path and following said blades, said pulley means normally guide the wire along the normal travel path, and means for moving one of said pulley means relative to the other pulley means and transversely to the wire travel path so as to form a loop in the wire thereby pulling a length of wire through the rotating blades equal to the length of wire in the loop which is formed by the moving pulley means.

19. The apparatus of claim 18 wherein said means for moving said one pulley means comprises a fluid piston and cylinder means for translating said one pulley means along a rectilinear path generally perpendicular to the wire travel path.

20. The apparatus of claim 18 wherein said one pulley means is positioned between two of said other pulley means and on an opposite side of the wire travel path therefrom.

21. The apparatus of claim 1 including a stator coil winding apparatus having a wire feed inlet and wherein said apparatus for stripping is interposed between a supply of wire and the wire feed inlet.

22. Apparatus for stripping the insulation off wire comprising:
a support frame,
wire guide means connected to said support frame for guiding wire along a predetermined wire travel path,
a blade assembly mounted on said frame comprising a plurality of circularly spaced blades encircling the wire travel path, and means for rotating said blades about an axis coaxial with the wire travel path, said blade assembly further comprising blade actuation means in engagement with said blades for causing said blades, while rotating, to move radially inwardly toward the wire travel path by a predetermined radial distance, whereby when wire is in the travel path, it will have the insulation stripped therefrom by the rotating blades,
means for pulling a predetermined length of wire through the rotating blades whereby the blades strip the insulation off said predetermined length of wire,
said blades being pivotally mounted on individual axes in said blade assembly so as to be capable of rocking inwardly toward the wire travel path,
said blade actuation means includes: a thrust block having a cam surface which engages a cam surface on each blade, means for moving said thrust block axially toward said blades to cause said blades to rock inwardly including a cam follower assembly connected to said thrust block having a cam follower and a cutting depth adjustment wheel having a cam surface engaged by said cam follower when the blade actuation means is actuated so as to limit the axial movement of said thrust block, said adjustment wheel cam surface having a variable depth and said adjustment wheel being movable to enable a selected portion of said adjustment wheel cam surface having a desired depth to be contacted by said cam follower, whereby the amount of inward rocking of said blades is determined by the depth of said adjustment wheel cam surface.

23. The apparatus of claim 22 wherein said adjustment wheel is calibrated.

24. The apparatus of claim 22 including detent means associated with said adjustment wheel for constraining said adjustment wheel to rotate by discrete increments.

25. The apparatus of claim 22 wherein said blade actuation means further includes: a support wheel to which said adjustment wheel is rotatably secured, said support wheel being connected to said frame, calibration means connected to said support wheel for permitting the position of said support wheel to be adjusted axially toward and away from said cam follower.

26. The apparatus of claim 25 wherein said calibration means comprises a threaded member to which said support wheel is keyed and which is coaxial with said support wheel, said threaded member being threadedly interconnected with said frame such that when said threaded member is turned, it will move axially relative to said frame.

27. The apparatus of claim 25 including means for clamping said threaded member against turning.

28. The apparatus of claim 27 wherein said adjustment wheel and said support wheel are adjacent and coaxial, said wheels include indicia thereon which indicates their relative rotational positions.

29. The apparatus of claim 25 wherein said adjustment wheel and said support wheel are adjacent and coaxial.

30. The apparatus of claim 22 including a stator coil winding apparatus having a wire feed inlet, and said apparatus for stripping is interposed between a supply of wire and said wire feed inlet.

* * * * *